United States Patent [19]

Steger

[11] Patent Number: 5,403,178

[45] Date of Patent: Apr. 4, 1995

[54] INJECTION UNIT FOR AN INJECTION MOLDING MACHINE

[75] Inventor: Reinhard Steger, Freiburg, Germany

[73] Assignee: Ferromatik Milacron Maschinenbau GmbH, Malterdingen, Germany

[21] Appl. No.: 135,558

[22] Filed: Oct. 14, 1993

[30] Foreign Application Priority Data

Oct. 30, 1992 [DE] Germany .................. 42 36 753.0

[51] Int. Cl.⁶ .................................................. B29C 45/23
[52] U.S. Cl. ................................ 425/557; 425/559; 425/561
[58] Field of Search ............... 425/557, 558, 559, 560, 425/561

[56] References Cited

U.S. PATENT DOCUMENTS

| | | | |
|---|---|---|---|
| 3,020,591 | 2/1962 | Breher | 425/558 |
| 3,245,115 | 4/1966 | Ecklund | 425/558 |
| 4,557,683 | 12/1985 | Meeker et al. | 425/559 |

Primary Examiner—Tim Heitbrink
Attorney, Agent, or Firm—Stephen H. Friskney

[57] ABSTRACT

An injection unit (1) for injection molding machines used in the manufacture of plastic objects has a nozzle element (2), a material feed system (7), a cylinder-piston unit (3, 4) arranged between the nozzle element (2) and the material feed system (7), a valve (10) arranged between the cylinder (4) and the material feed system (7), and a device (21) for pressing the nozzle element (2) to the edge of the gate of an injection mold. The nozzle element (2), and the piston (3) guided in the cylinder (4), may be integrally formed. The nozzle element has a channel (11) in alignment with an axial bore (13) in the piston (3). The channel (11) and bore (13) are in communication with the interior of the cylinder. The cylinder (4) can be moved in the direction of the longitudinal axis of the piston while the piston (3) does not move.

9 Claims, 2 Drawing Sheets

INJECTION UNIT FOR AN INJECTION MOLDING MACHINE

FIELD OF THE INVENTION

The present invention relates to an injection unit for use in a molding machine. More particularly, the invention relates to an injection molding unit wherein both filled and unfilled plastics as well as highly filled binders for processing powder metal and ceramic, and slip materials are processed without bubbles according to a first in-first out process. Even more particularly, the invention relates to an injection unit wherein material can be conveyed through the piston-cylinder unit without a reversal in the direction of material flow.

BACKGROUND OF THE INVENTION

An apparatus of the aforementioned kind is described in German patent application P 42 07 286.7. Liquid or plasticized material to be injected is transported in a cylinder sloped by 45° relative to the axis of injection or to the axis of the conveying screw. A non-return valve at the mouth of the cylinder prevents the material from flowing back again into the screw cylinder during the shot sequence. The material introduced into the cylinder is injected into the mold cavity with the aid of a piston through the injection nozzle. The material conveyed by the screw is deflected into the cylinder by a heart-shaped groove. Even though good results can be obtained with this apparatus for shots weighing up to 0.2 grams, the apparatus has some drawbacks.

One drawback is that the non-return valve denotes a weak point, especially when processing materials of low viscosity, because the closing movement of the non-return valve triggered by the injection movement has only an inadequate sealing effect.

Furthermore, the prior art apparatus exhibits poor flow cross sections. Because the material flows around the injection piston by way of the heart-shaped groove section, an unnecessary shear of the material takes place due to the piston during the injection process. In addition, the production of this apparatus is expensive and complicated.

Therefore, the present invention is based on the problem of designing an injection unit of the aforementioned kind in such a manner that a uniform flow of the material from the material feed system, by way of an injection cylinder, to the nozzle is guaranteed. Likewise, the present invention is based on the problem of providing for the manufacture of a simple unit.

SUMMARY OF THE INVENTION

The present invention relates to an injection unit for a molding machine which conveys a material through a piston-cylinder unit without a reversal in the direction of material flow and without any shearing of the plastic material. Instead, the material is conveyed in a straight line flow through the cylinder.

For thermoplastic processing, the unit according to the invention is preferably used in combination with a screw plasticizing unit. Precisely, in application cases where very high accuracy in metering is demanded, the invention offers decisive advantages. When the piston channel is suitably designed, significant improved controllability of the injection process can be obtained at high injection pressures and long metering strokes. Metering accuracy through the closing behavior, which occurs with the use of a known non-return valve, can be drastically reduced through the use of a ball check valve, a fulcrum pin closure, or a comparable closing system. In this embodiment, the screw unit must also be moved in addition to the cylinder during the injection process.

According to another embodiment of the invention, a sliding feed system is provided between the screw cylinder and the cylinder inlet, so that only the cylinder has to be moved as the accelerated mass during the injection operation. As a consequence of the straight line flow through all cylinder regions, a uniform flow of material is guaranteed. The risk that the material will deposit, a feature that could affect the injection movement, is avoided. In addition, sealing the piston against the moveable cylinder is not a problem due to the low processing temperatures and the injection pressures.

The present invention also provides an apparatus used for slip casting which comprises a cylinder-piston unit with a valve element, and a material feed system which comprises a hopper with an attached, flexible hose.

In all of the aforementioned cases, the cylinder is moved with the aid of pressure medium cylinders. However, it is self-evident that any other suitable drive system can be used.

BRIEF DESCRIPTION OF THE DRAWINGS

The invention is explained in detail with the aid of the accompanying drawings wherein.

DETAILED DESCRIPTION OF THE INVENTION

Figure 1:
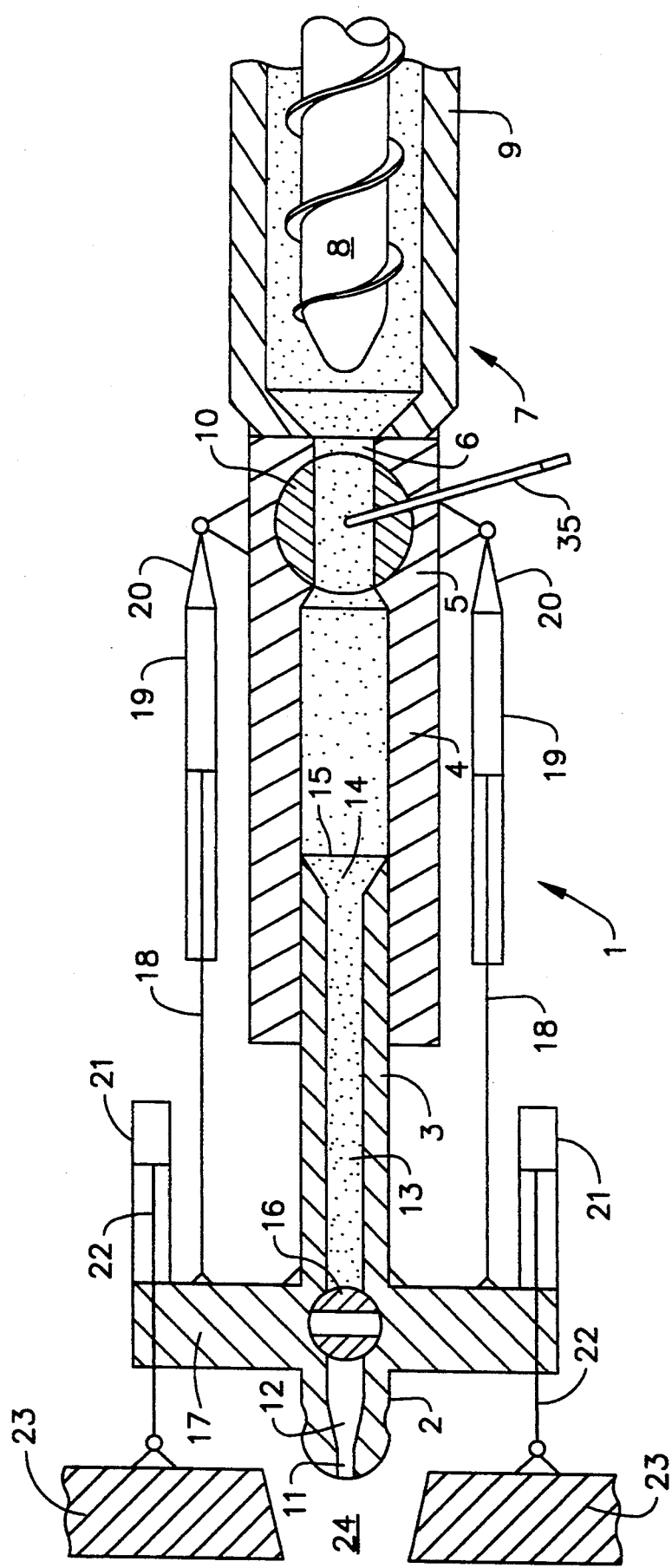
FIG. 1 is a schematic drawing of an injection unit according to the present invention.

FIG. 1 is a diagrammatic drawing of an injection unit which is denoted in general as reference numeral 1. It comprises a nozzle element 2, which represents an integral component of a piston 3, and which dips into a cylinder 4. The nozzle 2 can also be designed as a cylindrical insert member which is fastened in a suitable recess in the piston face. The seal between the piston 3 and the inner wall of the cylinder is provided by way of piston rings (not illustrated).

In the bottom 5 of the cylinder, opposite the piston 3, there is a bore 6 by way of which the cylinder chamber is connected to a material feed system 7. In the case shown, the feed system 7 has a plasticizing screw 8 which can be rotated in a screw sleeve or cylinder 9. The communication produced by the bore 6 can be opened and closed by a valve-controlled passage which may include a valve, for example, valve 10. In the embodiment shown in FIG. 1, a fulcrum pin closure is used and is shown in the direction of passage.

The fulcrum pin closure includes a cylindrical insert having a passage therethrough which is perpendicular to the longitudinal axis of the cylinder. The passage can be aligned with bores on either side of the insert so that material can flow between the bores. Means are also provided external to the cylinder and piston to turn the cylindrical insert so that the passage in the insert does not align with the bores on either side of the insert and thus communication is interrupted between the bores. The means to turn the insert may comprise a lever 35 as shown in FIG. 1.

The nozzle opening 11 diverges conically in the direction of the cylinder 4 in the region 12. This forms a cylindrical bore 13 just before the end of the piston 3 which expands like a funnel as far as the piston end 15 in the region 14. In the region of the cylindrical bore 13 there is another valve 16, also shown as a fulcrum pin closure. The valve 16 is shown in the closed position.

The piston 3 has, in the vicinity of the nozzle element 2, an annular flange (or yoke element) 17. The annular flange 17 serves as the point of engagement for the piston rods 18 of several pressure medium cylinders 19 arranged parallel to the piston-cylinder unit. The cylinder heads 20 of the cylinders 19 are attached to the outer wall of the cylinder 4.

When pressurized, the pressure medium cylinders 19 pull the cylinder 4 along the piston 3, until the cylinder bottom 5 stands close in front of the tapered, outwardly flaring mouth of the piston bore 13.

The annular flange 17 also serves as the supporting element of other pressure medium cylinders 21, whose piston rods 22 penetrate the annular flange 17 and engage at a nozzle plate 23. During the injection process the nozzle element 2 is pulled through the opening 24 of the nozzle plate 23 near the gate (not illustrated) of the mold to be filled. The pulling motion is provided by means of the pressure medium cylinders 21. The nozzle is held through the opening 24 during the injection of material.

During operation, the injection unit functions as follows:

In the starting state, the valve 10 is closed and the valve 16 is opened. The cylinder 4 is pushed on the piston 3 as far as the final position. At this stage the valve 16 is closed and the valve 10 is opened. The screw 8 conveys plastic material through the bore 6 into the cylinder 4, whereby during the subsequent transport operation the cylinder 4 is pushed back. When the desired level of material pressure is reached, the valve 10 is closed again. The piston-cylinder-nozzle unit is moved to the mold to be filled with the aid of the pressure medium cylinders 21. Then the valve 16 is opened again and the cylinder 4 is moved in the direction of the annular flange 17 with the aid of the pressure medium cylinders 19. At the same time, the plastic compound is driven out of the cylinder chamber. In the embodiment shown, the screw 8 and the screw cylinder 9 participate in the movement of the cylinder 4. However, it is also possible to arrange a sliding feed system between screw cylinder 9 and the cylinder 4, so that when shooting, only the cylinder 4 has to be moved.

Figure 2:
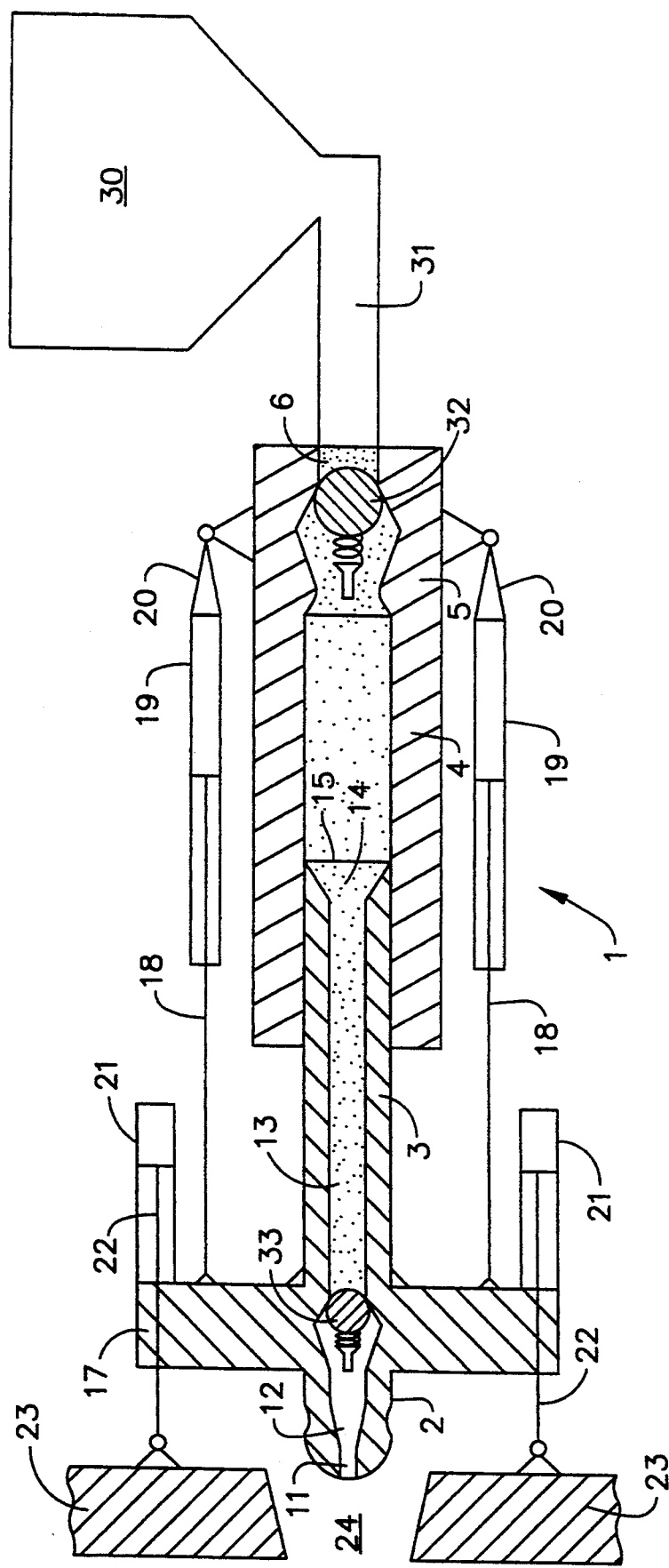
FIG. 2 is a schematic drawing of an injection unit according to another embodiment of the present invention.

If slip materials, such as suspended mineral substances, are to be processed, the screw unit 7 can be dispensed with. The material is fed then by way of a hopper 30 with an attached hose 31 which opens into the cylinder 4 as shown in FIG. 2. In this embodiment, too, only the cylinder 4 is moved. Also, as shown in FIG. 2, the valves can alternatively be ball-check valves as indicated by reference numerals 32 and 33.

Although the present invention has been described in connection with preferred embodiments, it will be appreciated by those skilled in the art that additions, modifications, substitutions and deletions not specifically described may be made without departing from the spirit and scope of the invention defined in the appended claims.

I claim:

1. An injection unit for injection molding machines used in the molding of plastic objects, said unit comprising a material feed system for supplying a flow of plastic material, a cylinder-piston unit in selective communication with said material feed system and comprising a cylinder and a piston, said piston having an axial bore for the passage of flowable plastic material, said axial bore communicating with the interior of the cylinder and communicating with a nozzle element at an outer end of said bore, said nozzle element including a nozzle channel in alignment with the axial bore in the piston, a valve-controlled passage between the cylinder and the material feed system for providing the selective communication between said material feed system and the cylinder, means for moving the nozzle element to the edge of a gate of an injection molding mold, and means for reciprocating the cylinder toward and away from said nozzle element along the longitudinal axis of the piston, wherein said valve-controlled passage interrupts the communication between the material feed system and the cylinder to prevent the flow of plastic material from the cylinder in the direction of said material feed system when the cylinder is moved toward the piston, and said valve-controlled passage provides a communication between the material feed system and the cylinder during movement of the cylinder away from the piston to enable a flow of plastic material from the material feed system to the cylinder.

2. An injection unit as defined in claim 1, wherein the inner end of the axial bore in the piston flares outwardly toward the inner wall of the cylinder.

3. An injection unit as defined in claim 1, wherein said reciprocating means comprises at least one pressure medium cylinder.

4. An injection unit as defined in claim 1, wherein a second valve-controlled passage is arranged between the axial bore in said piston and the nozzle channel.

5. An injection unit defined in claim 1, wherein external means are provided to open and close the first and second valve-controlled passages.

6. An injection unit as defined in claim 1, wherein the material feed system includes a plasticizing screw.

7. An injection unit as defined in claim 1, wherein the material feed system includes a hopper and a flexible hose in communication with the hopper and the cylinder.

8. An injection unit as defined in claim 6, wherein the plasticizing screw is contained within a sleeve connected to the cylinder for movement therewith.

9. An injection unit as defined in claim 1, wherein the piston and the nozzle element are integrally formed for movement as a single unit by said moving means.

* * * * *